United States Patent
Burgoon et al.

[11] Patent Number: 6,127,651
[45] Date of Patent: Oct. 3, 2000

[54] WELDING APPARATUS AND METHOD

[75] Inventors: Charles E. Burgoon, Port Arthur, Tex.; Donald J. Reis, Pollock Pines, Calif.

[73] Assignee: Westinghouse Electric Company LLC, Pittsburgh, Pa.

[21] Appl. No.: 09/171,750
[22] PCT Filed: Apr. 11, 1997
[86] PCT No.: PCT/US97/07579
   § 371 Date: Jun. 1, 1999
   § 102(e) Date: Jun. 1, 1999
[87] PCT Pub. No.: WO97/40955
   PCT Pub. Date: Nov. 6, 1997

Related U.S. Application Data
[60] Provisional application No. 60/016,453, Apr. 29, 1996.
[51] Int. Cl.$^7$ .................................................. B23K 9/167
[52] U.S. Cl. ........................................ 219/137 R; 219/75
[58] Field of Search ............................. 219/75, 136, 137, 219/71, 137 R

[56] References Cited

U.S. PATENT DOCUMENTS

| | | | |
|---|---|---|---|
| 3,483,354 | 12/1969 | Manz et al. | 219/137 R |
| 4,493,971 | 1/1985 | Nawa et al. | 219/136 |
| 4,531,040 | 7/1985 | Nawa et al. | 219/136 |
| 4,536,634 | 8/1985 | Nawa et al. | 219/75 |
| 4,801,781 | 1/1989 | Hori et al. | 219/137.71 |

*Primary Examiner*—Clifford C. Shaw

[57] ABSTRACT

The filler wire in hot wire-gas tungsten arc welding (HW-GTAW) apparatus is heated to near the melting point by application of the hot wire current over a determined length sufficient that the current required is low enough to avoid significant arc blow. This predetermined length of filler wire which approaches the molten state is supported by a ceramic sleeve which in turn may be protected by a stainless steel sheath.

1 Claim, 3 Drawing Sheets

WELDING APPARATUS AND METHOD

This application claims the benefit of U.S. provisional application Ser. No. 60/016,453, filed Apr. 29, 1996.

BACKGROUND OF THE INVENTION

1. Field of the Invention

This invention relates to apparatus and a method for welding and, in particular, to hot wire gas tungsten arc welding with specific attention paid to the manner and arrangement for heating the filler wire.

2. Background Information

In hot wire-gas tungsten arc welding (HW-GTAW) the filler wire is resistance heated before it enters into the weld pool to a cherry red condition, approximately 1400° F. to 1600° F., or just below the melting point. An electrical current is passed through the length of the filler wire between a contact tube through which the wire is fed and the work. This length of wire acts as a resistor. Resistance heating, also referred to as $I^2R$ heating, of the filler wire allows for higher deposition rates when compared with a normal cold wire feed GTAW machine welding process.

In order to raise the temperature of the wire close to the melting point with commercially available equipment, a high current must be applied to the wire. This causes two well documented problems, both associated with the phenomena commonly referred to as "arc blow." For discussion purposes, these two types of arc blow will be referred to as "type 1" and "type 2." Type 1 arc blow is a result of the continual deflection imposed upon the welding arc by the magnetic fields generated by the high currents needed to pre-heat the weld filler wire or Hot Wire (HW). The HW current interferes with the welding arc by deflecting it from its preferred cathode attachment point directly below the cathode, resulting in lack of fusion and other associated weld defects, i.e., hollow bead, cold lapping, lack of penetration, and so forth. Type 2 arc blow is the random arc deflection imposed upon the welding arc from the occasional breaking of the wire to puddle contact. Partly the result of the use of high HW current, the wire melts back and detaches itself from the weld pool. This in turn creates an even greater electrical interference on the welding arc as the partially molten, balled-up wire end, which is the electrical anode spot, searches for the preferential cathode, or arc attachment spot. This again results in weld quality problems, as listed above. It can cause also lead to false voltage readings when using a system with automatic voltage control (AVC) causing the torch to rise out of the weld groove and making it necessary to stop the welding process.

The best way to overcome arc blow incurred from the addition of HW to the GTAW process has been to limit the process to welding in the flat and roll positions only. To further help overcome the problems associated with the two types of arc blow, the weld wire is fed from the rear of the weld puddle. The rear wire feed method has been used because it presents a larger puddle surface to maintain the wire in contact with, and hopefully eliminate the melt back problem, or type 2 arc blow. This rear wire feed method makes it difficult for the operator to use in the field where it is necessary to view the weld puddle and feed wire to the front, welding in the forward direction. These practices, welding in the flat and roll positions, and feeding the wire from the rear, have limited the process application capability and have generally restricted the use of hot wire welding to a more controllable shop environment.

There is a need therefor for improved apparatus and method for hot wire-gas tungsten arc welding which makes it more versatile and capable of being used in all welding positions encountered in field use.

More particularly, there is a need for such an improved apparatus and method for HW-GTAW which eliminates, or at least greatly reduces, the arc blow phenomena.

There is a need for such an improved apparatus and method for HW-GTAW which still heats the HW to near the melting point to provide the capability for high deposition rates.

SUMMARY OF THE INVENTION

These needs and others are satisfied by the invention which is directed to an apparatus and method for hot wire-gas tungsten arc welding (HW-GTAW) in which the hot wire is heated to near its melting point by a current which reduces the likelihood of arc blow. More particularly, the wire heating current is applied along a longer length of the feed wire selected such that it is below the current which will result in arc blow yet sufficient to heat the filler wire to near its melting point prior to its being supplied to the weld pool. More particularly, the length of the filler wire is selected to be at least about two inches and preferably not longer than about eight inches.

As another aspect of the invention, a guide tube extends along at least a portion of the selected heated length of the filler wire to provide support for the filler wire. Preferably, a ceramic guide tube provides this support. In a specific embodiment of the invention, a stainless steel support sheath is positioned around at least a portion of the ceramic guide tube.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
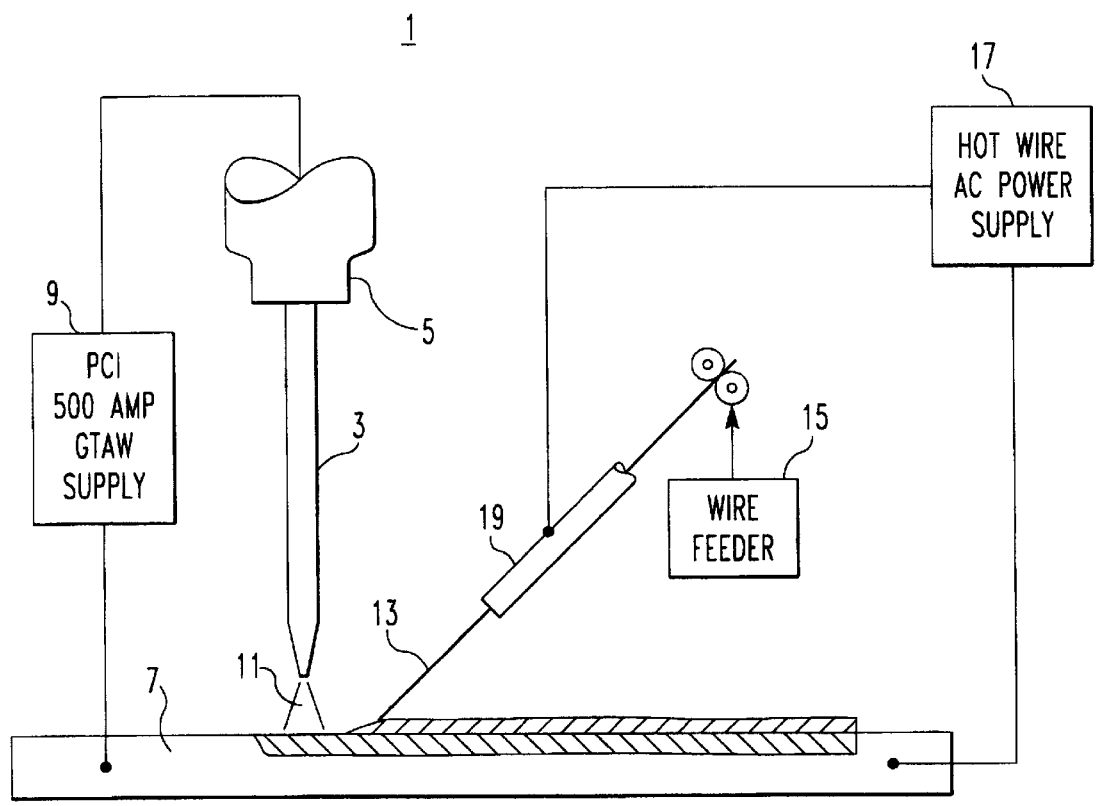
FIG. 1 is a schematic diagram of a typical prior art HW-GTAW system.

A conventional arrangement for hot wire-gas tungsten arc welding (HW-GTAW) 1 is shown in FIG. 1. The tungsten electrode 3 of the GTAW torch 5 is positioned adjacent the work piece 7 to be welded. A current generated by a power supply 9 such as a PCI, 500 amp GTAW power supply provided by PCI Energy Services of Lake Bluff, Ill. circulates through the tungsten electrode 3 and the work piece 7 to generate a welding arc 11 across a gap between the work piece and the tungsten electrode. Filler wire 13 is fed toward the arc 11 by a wire feeder 15. In the hot wire welding process, an ac electric current provided by a hot wire ac power supply 17 is injected into the filler wire 13 through a contact tube 19. This current circulates through the filler wire 13 and the work piece 7 thereby heating the section of the filler wire 13 between the contact tube 19 and the work piece 7. The $I^2R$ heating generated by this current raises the temperature of the heated section of the wire to just below the melting point. Due to the relatively short length of the filler wire 13 through which the hot wire current flows, the amplitude of the current needed to heat the wire to near the melting point is great enough to cause the arc blow phenomena and associated weld defects described above. As mentioned, this has generally restricted the use of hot wire welding to welding in the flat or roll position with rear wire feeding, procedures which are more controllable in a shop environment.

In accordance with the invention, the length of the electrical stick out, or length of the filler wire through which the hot wire current is passed, is increased over the typical prior art length. This greater length of the filler wire between the contact tube and the work piece increases the resistance in the circuit thereby reducing the amplitude of the current required for $I^2R$ heating necessary to bring the wire to a temperature just below its melting point at the weld pool. The lower current reduces the amount of arc blow, allows for lower weld wire entry angles, and more easily accommodates front wire feed of the filler wire allowing for all position and all application work.

Another aspect of the invention is directed to support of the length of pre-heated filler wire. In order to reduce the current by applying it through a longer length of filler wire, there is a need to be able to guide, support and shield this very long, almost molten, length of wire. This is achieved in accordance with the invention by adapting an electrical contact tube to hold a long piece of ceramic tube to guide the heated filler wire to the weld pool and achieve the desired resistance heating at the lower current.

An additional aspect of the invention is directed to protecting the brittle ceramic guide tube from damage during welding. In a preferred embodiment of the invention, this has been achieved by covering most of the ceramic guide tube by a stainless steel support sheath which also has a collet clamping end to secure the ceramic tube in place.

Yet another aspect of the invention is a feature providing adjustability to accommodate for deep narrow groove type welds. This is accomplished by capturing the wire contact tube by another collet contained in the hot block which allows for extension of the hot wire to reach into deep weld grooves.

Figure 2:
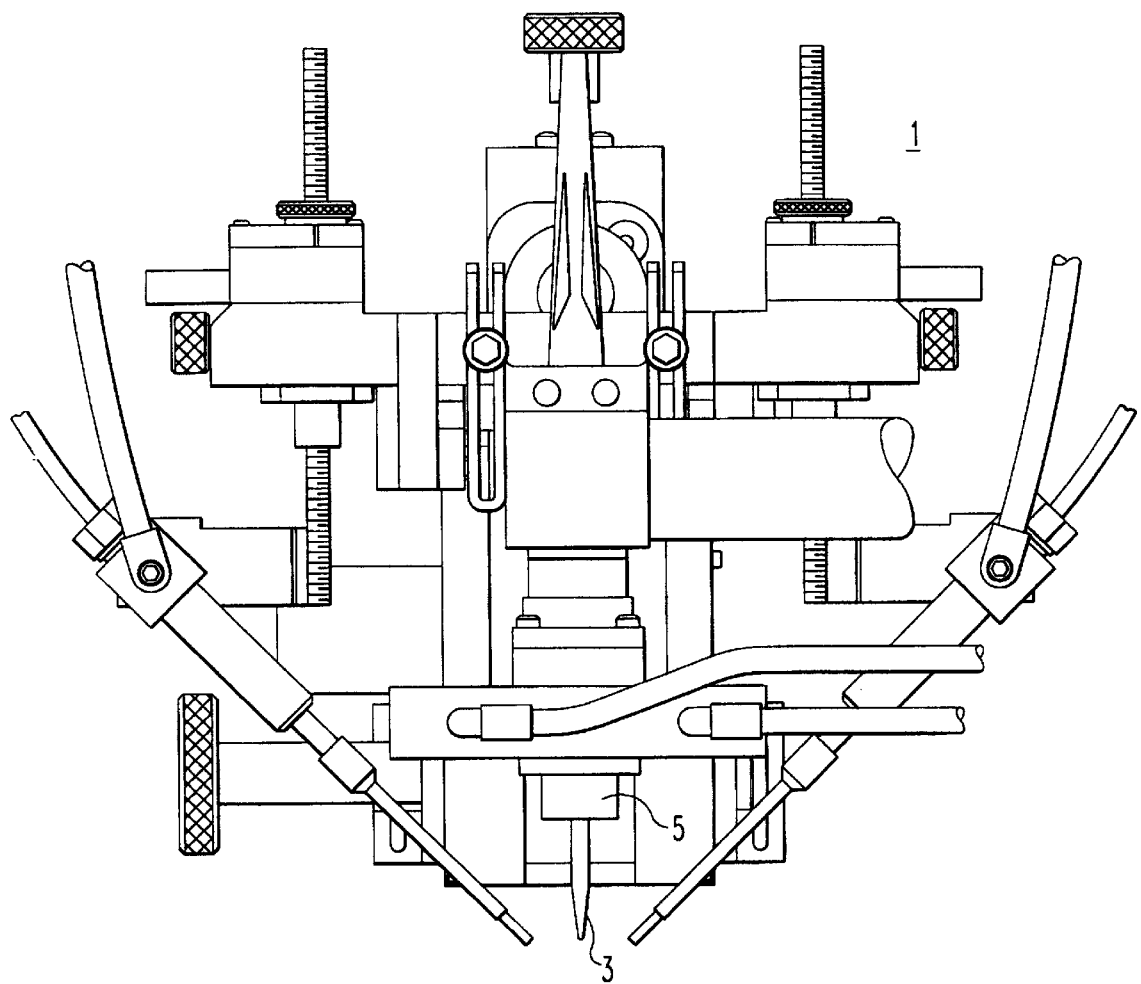
FIG. 2 is an elevation view of HW-GTAW apparatus incorporating the invention.
Figure 3:
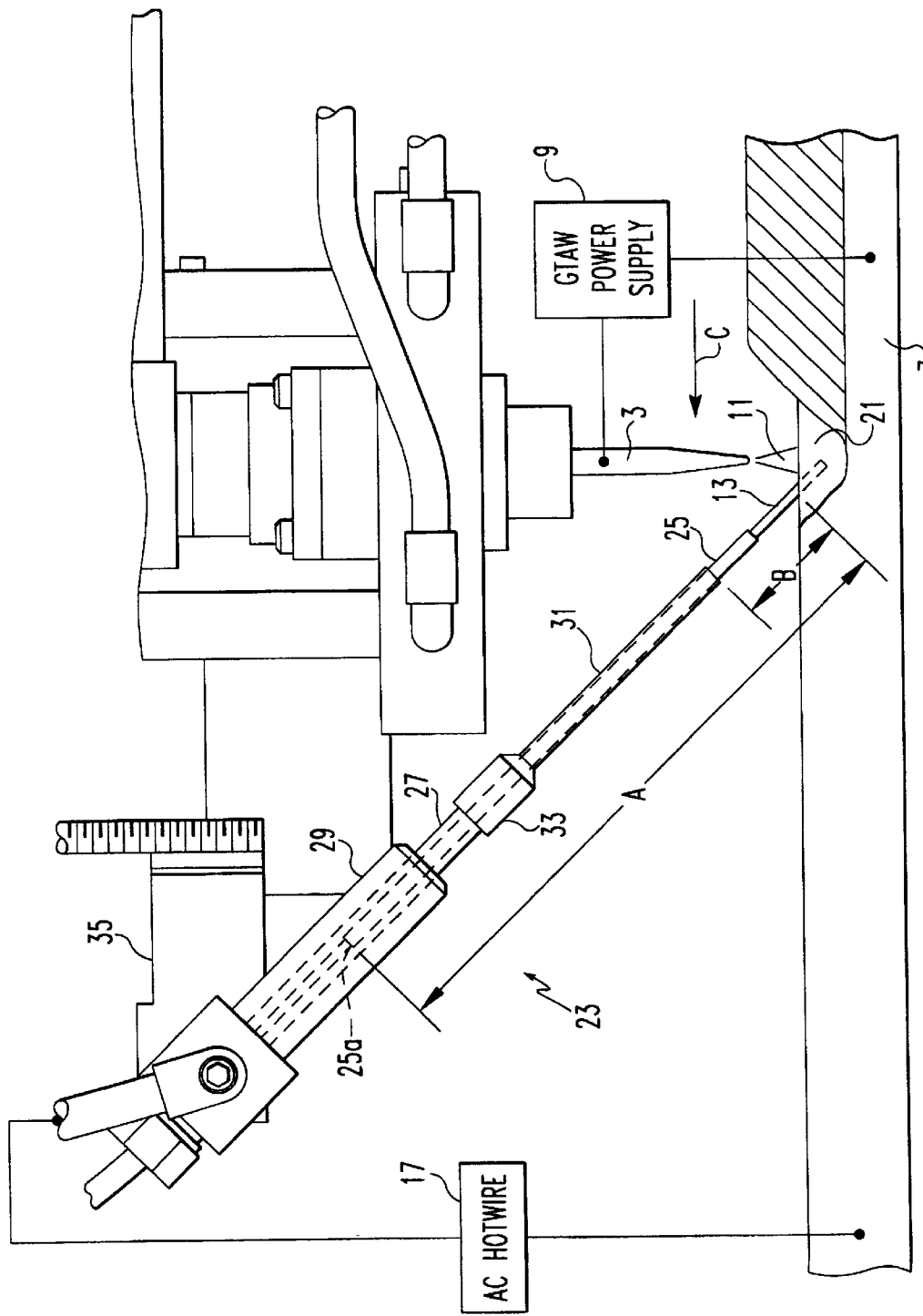
FIG. 3 is an enlarged portion of the apparatus of FIG. 2 illustrating the novel wire feed arrangement in accordance with the invention.

FIGS. 2 and 3 illustrate HW-GTAW apparatus 1 incorporating the invention. As in the case of the apparatus of FIG. 1, the HW-GTAW apparatus 1 of FIG. 2 includes a GTAW torch 5 incorporating a nonconsumable tungsten electrode 3. As shown schematically in FIG. 3, the GTAW power supply is connected between the tungsten electrode 3 and the work piece 7 thereby generating a welding arc between the work piece 7 and the tip of a tungsten electrode 3 which is spaced from the work piece. The heat generated by the welding arc 11 forms a weld pool or puddle 21. The filler wire 13 is fed into this weld puddle 21 by a filler wire feed mechanism 23.

The filler wire feed mechanism 23 includes a ceramic guide tube 25 which provides support for the nearly molten heated portion of the filler wire 13. The ceramic tube 25 extends up into an electrically conductive contact tube 27 which projects from a contact block 29. The filler wire 13 is fed through the contact block, contact tube and ceramic tube by a wire feeder 15, shown in FIG. 1. Current is applied to the filler wire 13 through the upper end of the contact tube 27 above the upper end 25a of the ceramic tube 25 by the contact block 29 which is connected to the HW ac power supply 17 also connected to the work piece 7.

Preferably, the ceramic tube 25 is protected by a stainless steel sheath 31 extending along the major portion of the ceramic tube. The stainless steel tube 31 has an internally threaded collar 33 on its upper end which threads onto the lower end of the contact tube 27. This lower end of the contact tube 27 forms a collet which clamps against the ceramic tube 25 to secure it in place. The filler wire feed mechanism 23 is mounted on the HW-GTAW apparatus 1 by an adjustable support 35 so that the filler wire 13 may be extended into the weld puddle 21. The length A of the filler wire from the weld puddle 21 to the top 25a of the ceramic tube 25 where the wire makes electrical contact with the contact tube 27 is the predetermined length of the filler wire which is heated and is referred to as the "electrical stick-out" length. This electrical stick-out length A is determined by the length of the ceramic tube 25 and the dimension B which is the length of the filler wire between the end of the ceramic tube and the weld puddle 21. This dimension B is referred to as the "wire stick-out." The length of the electrical stick-out A is an essential welding parameter which determines how molten the filler wire 13 will be at a given current level before it reaches the weld puddle 21. Experiments have proved that electrical stick-out lengths of about two to about eight inches yield desirable results. For deep groove welding, the contact tube carrying the ceramic tube 25 and the stainless steel support sheath 31 can be extended relative to the contact block 29. This can be accomplished while maintaining the electrical stick-out length A constant. The invention makes it practical to feed the filler wire 13 into the weld puddle 21 from the front of the weld as indicated by the arrow C in FIG. 3 showing the direction of travel of the welding machine.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A hot wire method of gas tungsten arc welding for creating a weldment on a work piece, comprising:

moving a torch comprising a non-consumable gas tungsten arc welding electrode in a forward direction past a workpiece in an out of flat or roll position welding application;

generating an arc between said forward moving torch and said work piece to create a weld pool adjacent a weldment, said weld pool having a front portion spaced from said weldment in the forward direction of torch travel, with said arc in contract with said front portion;

heating a predetermined length of said filler wire with a hot wire power supply as it is being supplied to said weld pool for providing sufficient electrical resistance to control the current supplied to said filler wire by said hot wire power supply to below that which will cause interruption of said arc while providing sufficient heating of said filler wire to bring said filler wire to near its melting point; and supplying said heated filler wire from the forward direction to said front portion of said weld pool.

* * * * *